United States Patent [19]
Reay et al.

[11] Patent Number: 6,018,549
[45] Date of Patent: Jan. 25, 2000

[54] SELECTABLE MULTI-PROTOCOL CABLE TERMINATION

[75] Inventors: Robert Loren Reay, Mountain View; Heng Yun, San Jose, both of Calif.

[73] Assignee: Linear Technology Corporation, Milpitas, Calif.

[21] Appl. No.: 08/873,545

[22] Filed: Jun. 12, 1997

[51] Int. Cl.[7] .................................................. H04B 3/00
[52] U.S. Cl. ........................................... 375/257; 375/377
[58] Field of Search .................................. 375/257, 377; 326/30; 270/420, 421, 465

[56] References Cited

U.S. PATENT DOCUMENTS

| | | | |
|---|---|---|---|
| 4,403,111 | 9/1983 | Kelly ............................................. | 178/69 |
| 5,029,284 | 7/1991 | Feldbaumer et al. ..................... | 307/443 |
| 5,257,289 | 10/1993 | Jopson ....................................... | 375/36 |
| 5,357,608 | 10/1994 | Bartow et al. ............................ | 395/200 |
| 5,706,447 | 1/1998 | Vivio .......................................... | 395/309 |
| 5,726,583 | 3/1998 | Kalinsky ..................................... | 326/30 |
| 5,737,364 | 4/1998 | Cohen et al. ............................. | 375/220 |
| 5,781,028 | 7/1998 | Decuir ....................................... | 326/30 |

*Primary Examiner*—Stephen Chin
*Assistant Examiner*—Mohammad Ghayour
*Attorney, Agent, or Firm*—Fish & Neave; Robert W. Morris; Garry J. Tuma

[57] ABSTRACT

An integrated cable-termination circuit is presented that can be selectably automatically configured to terminate a signal cable in conformance with one of a plurality of electrical interface standards, including, for example, CCITT/EIA standards V.11/RS-422 and V.35. Selected termination configurations are maintained when input voltages exceed power supply voltages or when power to the circuit is removed. A plurality of cable-termination circuits are provided to form an integrated selectable cable terminator for selectably terminating multiple cables, each in conformance with one of a plurality of electrical interface standards.

44 Claims, 7 Drawing Sheets

SELECTABLE MULTI-PROTOCOL CABLE TERMINATION

BACKGROUND OF THE INVENTION

This invention relates to electronic cable termination. More particularly, this invention relates to multi-protocol cable-termination circuits.

Electronic devices communicate with each other by transmitting and receiving signals (e.g., data and control) via signal lines or cables. Signal cables should be properly terminated to dissipate the energy of the signal pulse, and to reduce the undesirable transmission line effects of signal reflection or "ringing." Signal cables are usually terminated with a resistive termination circuit typically connected in parallel with driver and receiver circuits. To determine the proper configuration and impedance values of a termination circuit, particular electrical information, such as, for example, transmitted signal voltage levels, signal cable impedance, and the internal impedance of the driver and receiver circuits should be known.

Electrical interface standards were developed to standardize, among other things, cable terminations between communicating devices. These interface standards provide electrical specifications, known as protocols, that specify termination configurations and impedance values. Over the years, however, many standards evolved to cover either broad areas of information transmission or unique requirements in specific applications. For example, in the United States, the Electronics Industries Association (EIA) developed a number of different standards, such as, for example, RS-232, RS-422, and RS-423. Similarly in Europe, the Comité Consultif Internationale Télégraphique et Téléphone (International Consultative Committee for Telegraph and Telephone, or CCITT) also developed a number of different standards, such as, for example, V.10, V.11, V.28, and V.35. For the most part, the EIA and CCITT standards are compatible. For example, RS-422 is compatible with V.11, RS-232 is compatible with V.28, and RS-423 is compatible with V.10. These interface standards have been accepted generally by most manufacturers of electronic data transmission and business equipment.

Thus, if a device communicates with other devices that each adhere to the same interface standard, a termination circuit in conformance with that standard can be readily ascertained and used. However, if a device communicates with other devices, two or more of which adhere to different interface standards, several termination circuits, each in conformance with one of the interface standards, are typically required.

Commonly, multiple cable connectors or termination modules are provided that each conform to a different interface standard. Unfortunately, these connectors or modules must be manually reconnected each time the interface standard changes. Moreover, access to these connectors or modules should be maintained to permit reconnecting. Custom cables, each with a particular termination built into the cable head, are also known, but they too unfortunately require manual reconnecting. Furthermore, such custom cables are often expensive. Separate connectors, termination modules, and custom cables, moreover, require manufacturers to stock and maintain large inventories to satisfy the different termination standards, thereby further increasing costs.

External switching resistors with electromechanical relay circuits that can switch terminations in response to received signals are also known. These devices eliminate the time-consuming and cumbersome task of manually changing cable connections. However, such devices are often expensive and physically large, thus increasing costs and requiring considerable space—space that either is not readily available or cost-effective for such use. Separate terminations built onto a circuit board with a custom cable that automatically routes the signals to the appropriate termination are also known. But these too require considerable space to accommodate the large connectors that are needed. In sum, known cable terminations are impractical because they are either expensive, cumbersome, time-consuming, or physically large.

Designing an integrated multi-protocol cable-termination circuit that is advantageous in comparison to the known techniques described above presents a problem of how to maintain a particular termination configuration when voltages on the input terminals exceed supply voltages or when power to the cable-termination circuit is off. For example, if MOSFETs (metal-oxide-semiconductor field effect transistors) are used to switch termination configurations, non-conducting MOSFETs may incorrectly turn ON (i.e., conduct) when the input signal voltage exceeds the supply voltage, because the inherent well and substrate diodes in those non-conducting MOSFETs may forward bias and thus conduct. Input signal voltages can exceed supply voltages when, for example, the V.28/RS-232 electrical interface standard is adhered to, because input voltage swings of +/−15 volts are likely, while MOSFET supply voltages are usually in the +/−5 volt range.

Similarly, non-conducting MOSFETs may also turn ON incorrectly when power to the cable-termination circuit is off while voltages at the input terminals are of such a magnitude that either the gate-to-drain or gate-to-source voltage forces a MOSFET into conduction, or the inherent well and substrate diodes forward bias, resulting in conduction.

In view of the foregoing, it would be desirable to provide an integrated multi-protocol cable-termination circuit that is physically small, requires little access space, and can be selectably automatically configured to terminate a signal cable in conformance with one of a plurality of electrical interface standards.

It would also be desirable to provide an integrated multi-protocol cable-termination circuit that maintains a selected termination configuration when input voltages exceed supply voltages or when power to the termination circuit is off.

It would further be desirable to provide an integrated selectable cable terminator for terminating multiple cables that includes a plurality of multi-protocol cable-termination circuits that can be selectably automatically configured to conform to one of a plurality of electrical interface standards.

SUMMARY OF THE INVENTION

It is an object of this invention to provide an integrated multi-protocol cable-termination circuit that is physically small, requires little access space, and can be selectably automatically configured to terminate a signal cable in conformance with one of a plurality of electrical interface standards.

It is also an object of this invention to provide an integrated multi-protocol cable-termination circuit that maintains a selected termination configuration when input voltages exceed supply voltages or when power to the termination circuit is off.

It is further an object of this invention to provide an integrated selectable cable terminator for terminating multiple cables that includes a plurality of multi-protocol cable-termination circuits that can be selectably automatically configured to conform to one of a plurality of electrical interface standards.

In accordance with this invention, there is provided a multi-protocol cable-termination circuit that includes first and second input terminals, first and second control terminals, a common terminal, and termination circuitry. The termination circuitry is coupled to the first and second input terminals, to the first and second control terminals, and to the common terminal. The cable-termination circuit can be selectably automatically configured to terminate a cable in conformance with at least one of a plurality of electrical interface standards.

A selectable cable terminator that includes a plurality of the multi-protocol cable-termination circuits is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
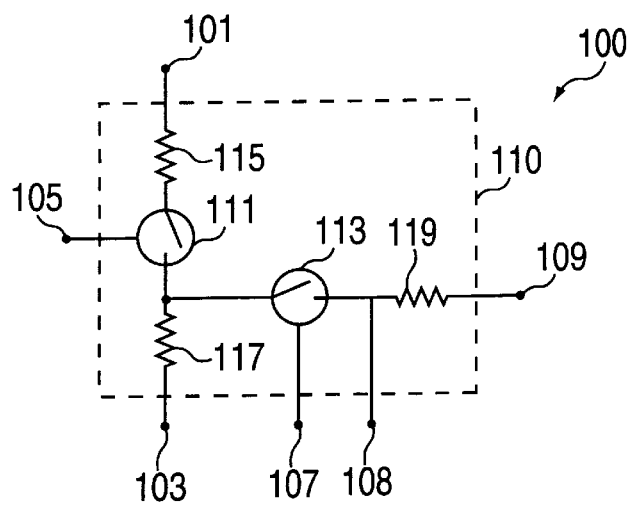
FIG. 1 is a schematic diagram of an exemplary embodiment of a selectable multi-protocol cable-termination circuit according to the present invention.

The present invention provides a cable-termination circuit that can be selectably automatically configured to terminate a signal cable in conformance with at least one of a plurality of electrical interface standards. While the present invention can be practiced using discrete components, the circuits of the present invention are preferably integrated. FIG. 1 is a schematic diagram of an exemplary embodiment of a cable-termination circuit in accordance with the principles of the present invention. Cable-termination circuit 100 can be configured via software control (not shown and discussed further below) as an open circuit, a differential load termination, or both a differential and common-mode load termination. Preferably, cable-termination circuit 100 is integrated and fabricated on a single electronic chip, thus advantageously requiring less space than the known cable termination circuits previously discussed.

Cable-termination circuit 100 includes first and second input terminals 101 and 103, first and second control terminals 105 and 107, common terminal 109 (which is typically coupled to ground), and termination circuitry 110. Termination circuitry 110 includes first and second switches 111 and 113, first resistive element 115, second resistive element 117, and third resistive element 119. As shown in FIG. 1, the series combination of first switch 111 and first and second resistive elements 115 and 117 is coupled between first and second input terminals 101 and 103. Moreover, the series combination of second switch 113 and third resistive element 119 is coupled to common terminal 109 and to a node between first and second resistive elements 115 and 117. Note that the series combination of first switch 111 and first and second resistive elements 115 and 117 may be coupled in any series order, and that the series combination of second switch 113 and third resistive element 119 may be coupled in reverse series order. Optionally, cable-termination circuit 100 includes center tap output terminal 108 coupled between third resistive element 119 and a node between first and second resistive elements 115 and 117.

Figure 2:
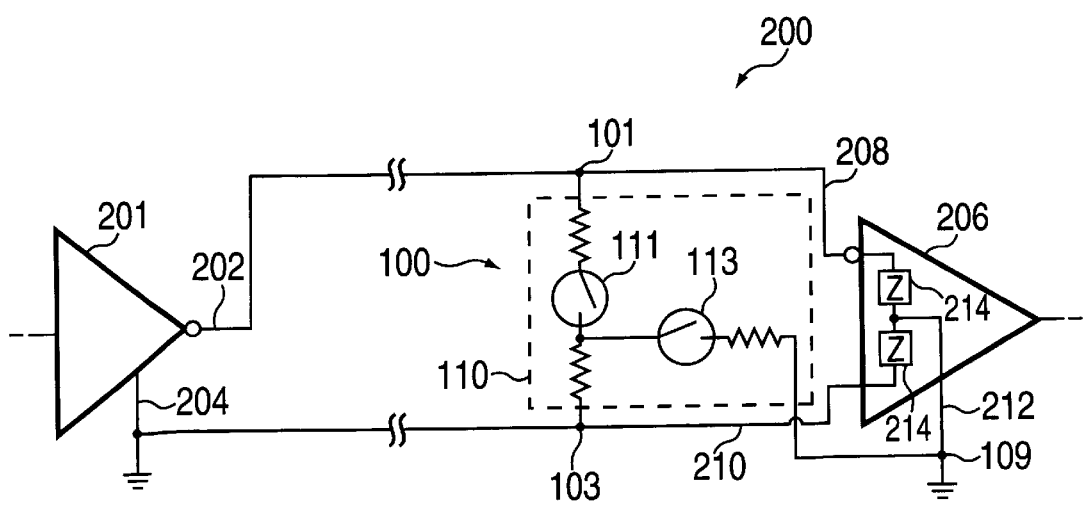
FIG. 2 is a schematic diagram of the circuit of FIG. 1 used to terminate a cable in conformance with the V.10/RS-423 electrical interface standard according to the present invention.
Figure 3:
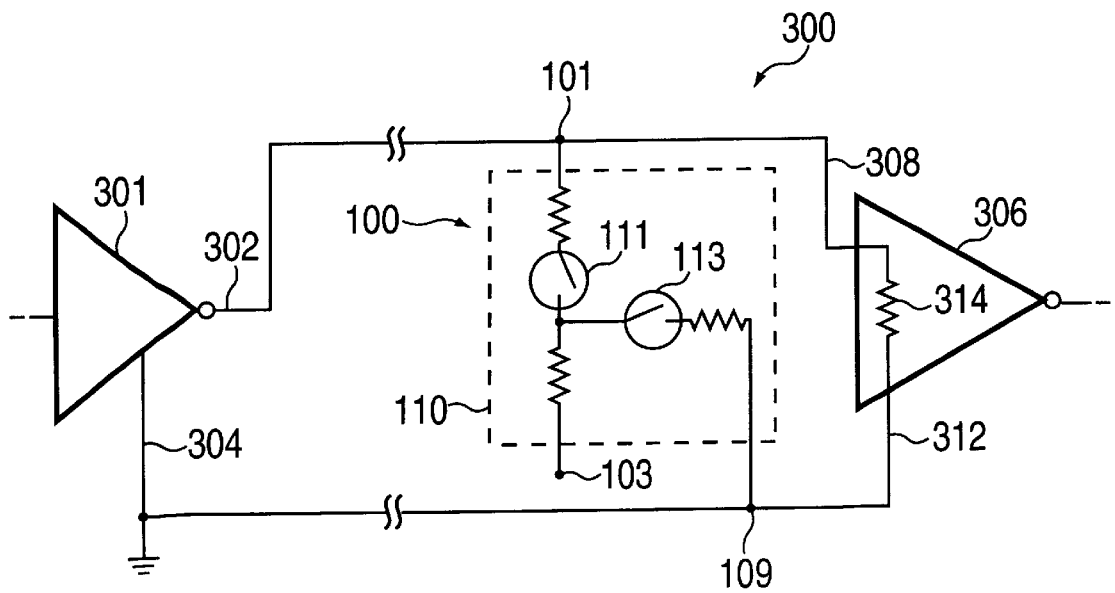
FIG. 3 is a schematic diagram of the circuit of FIG. 1 used to terminate a cable in conformance with the V.28/RS-232 electrical interface standard according to the present invention.

To configure cable-termination circuit 100 as an open circuit for conformance with, for example, the V.10/RS-423 or V.28/RS-232 electrical interface standards, both switches 111 and 113 are open, as shown in FIGS. 2 and 3. Typically, the internal input impedance of receivers adhering to the V.10/RS-423 or V.28/RS-232 interface standards provides the required cable termination impedance.

FIG. 2 shows a typical V.10/RS-423 unbalanced interface with cable-termination circuit 100 coupled in parallel. (For clarity, control terminals 105 and 107 and optional center tap output terminal 108 of cable-termination circuit 100 are not shown in FIG. 2.) A V.10/RS-423 single-ended driver 201 having an output 202 and a signal return ground 204 is coupled to V.10/RS-423 differential receiver 206 at inputs 208 and 210, respectively. Ground connection 212 of receiver 206 is separate from signal return ground 204. Cable-termination circuit 100 is coupled to receiver 206 as follows: first input terminal 101 is coupled to input 208, second input terminal 103 is coupled to input 210, and common terminal 109 is coupled to ground connection 212.

Control signals coupled to control terminals 105 and 107 (not shown in FIG. 2) open switches 111 and 113 to configure cable-termination circuit 100 as an open circuit. Thus cable termination is provided by input impedance 214 of receiver 206.

FIG. 3 shows a typical V.28/RS-232 unbalanced interface with cable-termination circuit 100 coupled in parallel. (For clarity, control terminals 105 and 107 and optional center tap output terminal 108 of cable-termination circuit 100 are not shown in FIG. 3.) A V.28/RS-232 single-ended driver 301 having an output 302 is coupled to V.28/RS-232 single-ended receiver 306 at input 308. Signal return ground 304 is coupled to ground connection 312. Cable-termination circuit 100 is coupled to receiver 306 as follows: first input terminal 101 is coupled to input 308 and common terminal 109 is coupled to ground connection 312. Second input terminal 103 is not coupled.

The V.28/RS-232 interface standard requires a 5 k-ohm terminating resistor to ground, which is provided by receiver resistor 314. Accordingly, control signals coupled to control terminals 105 and 107 (not shown in FIG. 3) open switches 111 and 113 to configure cable-termination circuit 100 as an open circuit, thus permitting resistor 314 to provide the required cable termination.

Figure 4:
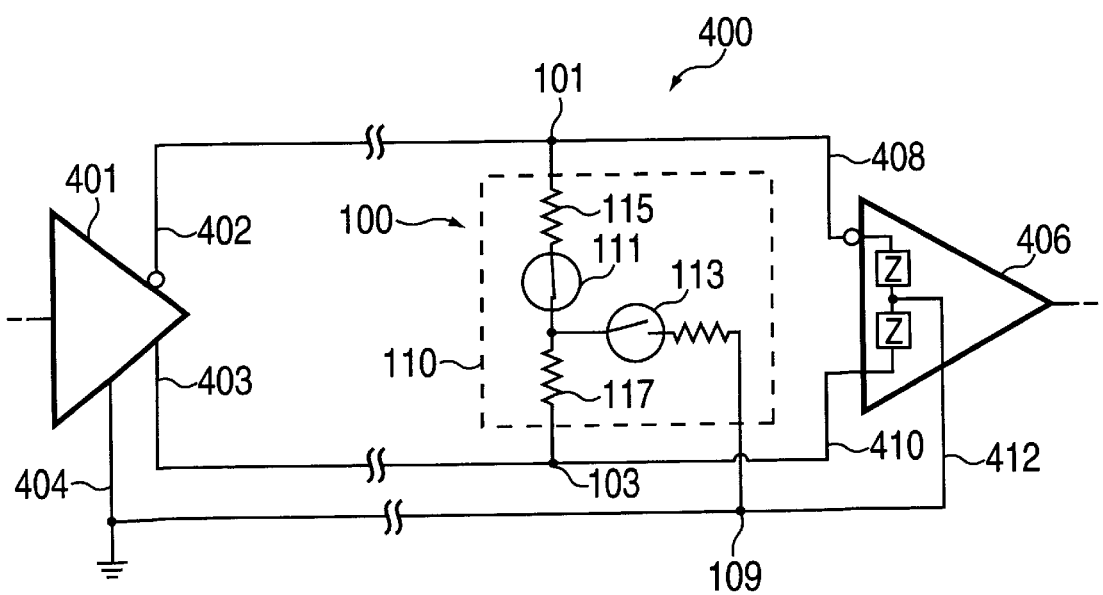
FIG. 4 is a schematic diagram of the circuit of FIG. 1 used to terminate a cable in conformance with the V.11/RS-422 electrical interface standard according to the present invention.

To configure cable-termination circuit 100 as a differential load termination in conformance with, for example, the V.11/RS-422 electrical interface standard, switch 111 is closed while switch 113 is open, as shown in FIG. 4. (For clarity, control terminals 105 and 107 and optional center tap output terminal 108 of cable-termination circuit 100 are not shown in FIG. 4.) A V.11/RS-422 differential generator 401 having outputs 402 and 403 and ground connection 404 is coupled to V.11/RS-422 differential receiver 406. Output 402 is coupled to input 408, output 403 is coupled to input 410, and ground connection 404 is coupled to ground connection 412. Cable-termination circuit 100 is coupled to receiver 406 as follows: first input terminal 101 is coupled to input 408, second input terminal 103 is coupled to input 410, and common terminal 109 is coupled to ground connection 412.

The V.11/RS-422 interface standard requires a minimum value of 100 ohms across inputs 408 and 410. Controls signals coupled to control terminals 105 and 107 (not shown in FIG. 4) close switch 111 and open switch 113. This connects resistive element 115 in series with resistive element 117. Thus, if the sum of resistive elements 115 and 117 is at least 100 ohms (e.g., each is approximately 50 ohms or more) the V.11/RS-422 specification is met.

To configure cable-termination circuit 100 for both differential and common-mode load termination in conformance with, for example, the V.35 interface standard, both switches 111 and 113 are closed. A typical V.35 balanced interface with two cable-termination circuits 100, one coupled in parallel with a driver and the other coupled in parallel with a receiver, is shown in FIG. 5.

The V.35 interface requires proper termination at both the driver and receiver ends. Thus cable-termination circuit 100a is coupled in parallel with the outputs of V.35 differential driver 501 (for clarity, control terminals 105a and 107a of cable-termination circuit 100a are not shown), and cable-termination circuit 100b is coupled in parallel with the inputs of V.35 differential receiver 506 (for clarity, control terminals 105b and 107b and optional center tap output terminal 108b of cable-termination circuit 100b are not shown). In particular, cable-termination circuit 100a is coupled to driver 501 as follows: first input terminal 101a is coupled to output 502, second input terminal 103a and center tap output terminal 108a are coupled to output 503, and common terminal 109a is coupled to ground connection 504. Similarly, cable-termination circuit 100b is coupled to receiver 506 as follows: first input terminal 101b is coupled to input 508, second input terminal 103b is coupled to input 510, and common terminal 109b is coupled to ground connection 512.

V.35 differential driver 501 is coupled to V.35 differential receiver 506 as follows: output 502 is coupled to input 508, output 503 is coupled to input 510, and ground connection 504 is coupled to ground connection 512.

Figure 5:
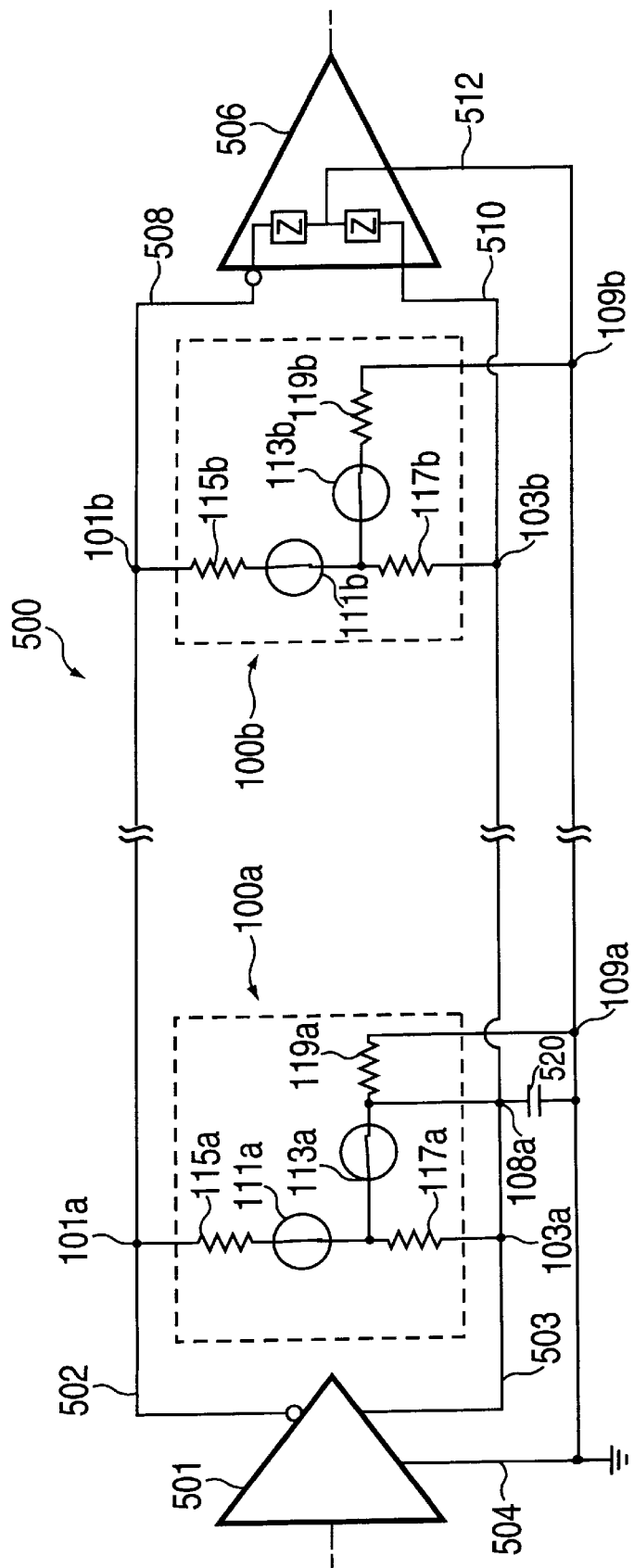
FIG. 5 is a schematic diagram of the circuit of FIG. 1 used to terminate a cable in conformance with the V.35 electrical interface standard according to the present invention.

To provide both a differential load termination and a common-mode load termination, control signals coupled to control terminals 105a,b and 107a,b (not shown) close both pairs of switches 111a,b and 113a,b, as shown in FIG. 5.

The V.35 standard specifies that the differential load impedance, measured across outputs 101a and 103a of cable-termination circuit 100a, and across inputs 101b and 103b of cable-termination circuit 100b, should be 100 ohms +/−10 ohms. Thus the differential load impedance is simply the series sum of resistive elements 115a and 117a of cable-termination circuit 100a, and the series sum of resistive elements 115b and 117b of cable-termination circuit 100b. Accordingly, by selecting values of, for example, approximately 50 ohms each for resistive elements 115a,b and 117a,b, the V.35 standard is met:

50 ohms+50 ohms=100 ohms

The V.35 standard also specifies that the common-mode load impedance, measured across shorted input terminals 101a and 103a of cable-termination circuit 100a and ground, and across shorted input terminals 101b and 103b of cable-termination circuit 100b and ground, should be 150 ohms +/−15 ohms. By selecting a value of approximately 125 ohms for resistive elements 119a,b, the common-mode load impedance is calculated as follows:

(50|50)+125=25+125=150 ohms

Thus the common-mode load impedance specification for the V.35 standard is met.

Any mismatch in output signal rise and fall times, or skew in the output signal propagation delays, forces current through resistive element 119a to ground, causing a high frequency common-mode spike on input terminals 101a and 103a. This common-mode spike can cause EMI (electromagnetic interference) problems. However, by coupling bypass capacitor 520 between center tap output terminal 108a and ground connection 504, much of the common-mode energy is shunted to ground rather than down the cable. Thus EMI is advantageously reduced.

Figure 6:
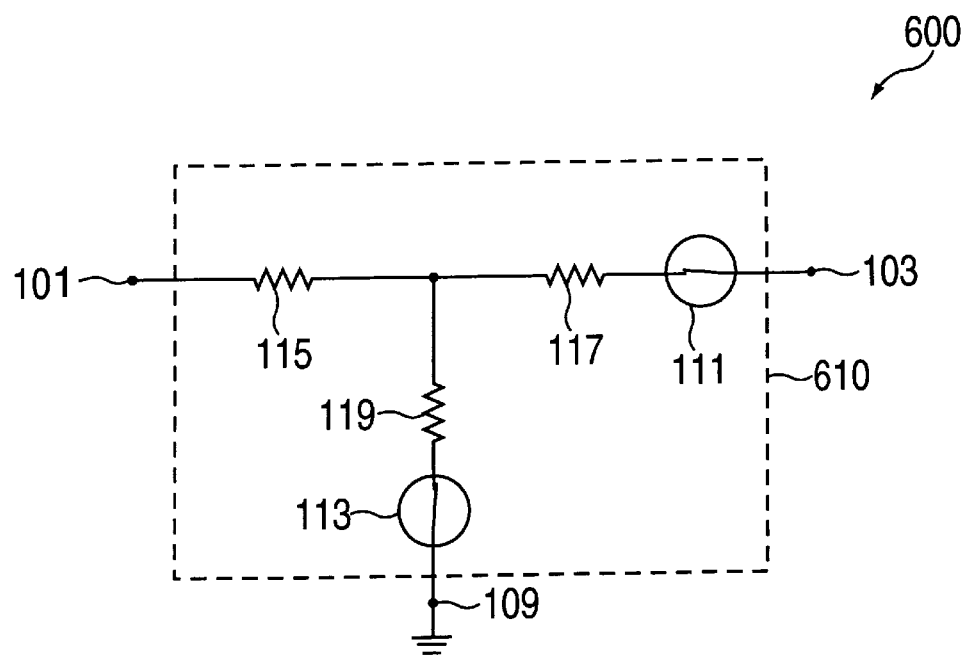
FIG. 6 is a schematic diagram of an exemplary embodiment of a selectable multi-protocol cable-termination circuit with T-network termination circuitry according to the present invention.
Figure 7:
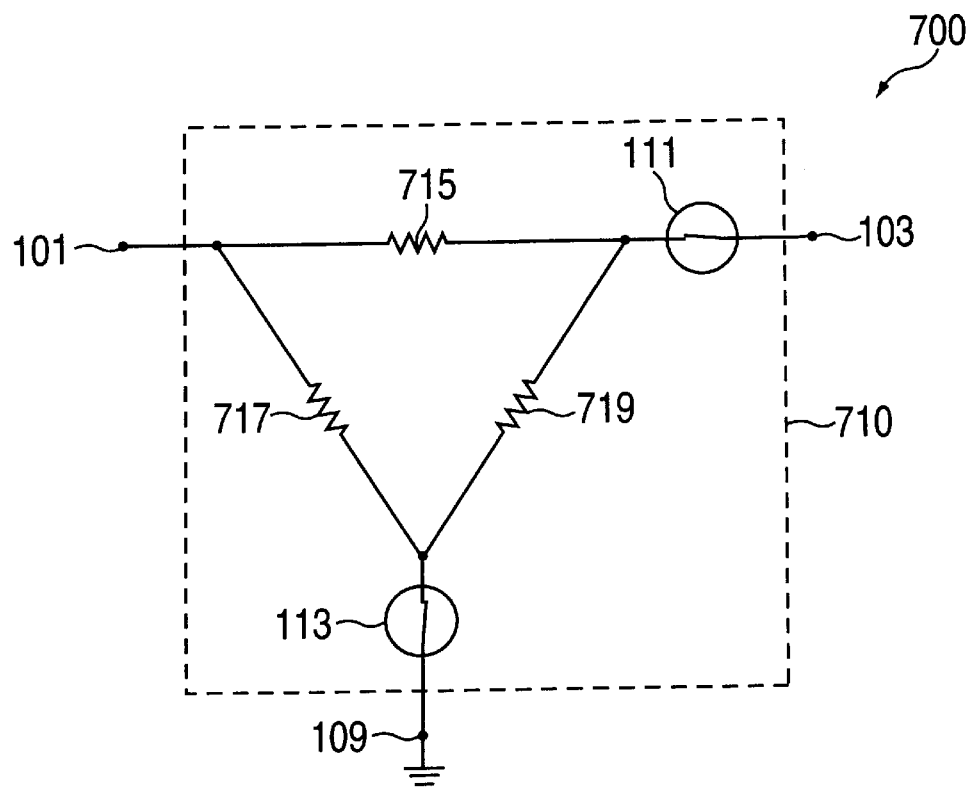
FIG. 7 is a schematic diagram of an exemplary embodiment of a selectable multi-protocol cable-termination circuit with delta network termination circuitry according to the present invention.

Although termination circuitry 110 of cable-termination circuits 100 and 100a,b are T-network configurations, as shown by T-network termination circuitry 610 in FIG. 6, delta network termination circuitry can alternatively be used in accordance with this invention, as shown in termination circuitry 710 of FIG. 7. For example, if resistive element 715 is approximately 120 ohms and resistive elements 717 and 719 are each approximately 300 ohms, the V.35 standard is met as shown below:

differential load: 120||(300+300)=100 ohms common-mode load: 300||300=150 ohms

Furthermore, by closing switch 111 and opening switch 113, cable-termination circuit 700 can be used to terminate a cable in conformance with the V.11/RS-422 standard. And, by opening switches 111 and 113, cable-termination circuit 700 can be configured as an open circuit for terminating a cable in conformance with the V.28/RS-232 or V.10/RS-423 standards. Thus, a range of electrical interface standards can be met with delta network termination circuitry.

Figure 8:
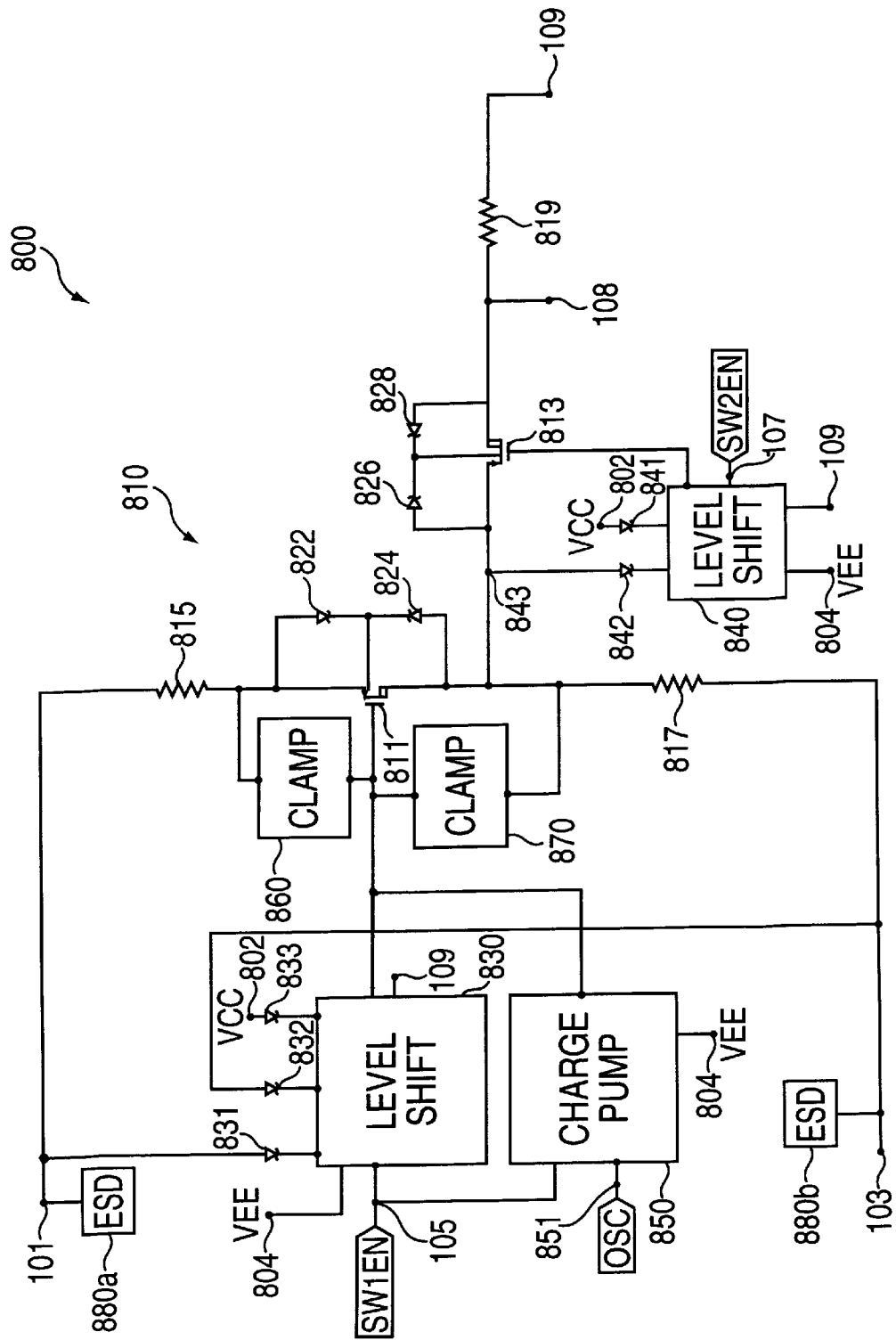
FIG. 8 is a schematic block diagram of an exemplary embodiment of a selectable multi-protocol cable-termination circuit according to the present invention.

Preferably, first and second switches 111 and 113 are MOSFETs (metal-oxide-semiconductor field effect transistors). An exemplary embodiment of a selectable multi-protocol cable-termination circuit using P-channel MOSFETs, or PMOS transistors, in accordance with the present invention is shown in FIG. 8.

Cable-termination circuit 800 is preferably integrated and fabricated on a single electronic chip, thus advantageously requiring less space than the known cable termination circuits. Cable-termination circuit 800 includes termination circuitry 810, input terminals 101 and 103, control terminals 105 and 107, and common terminal 109 (which is typically coupled to ground). Optionally, center tap output terminal 108 is also included. In addition, input supply voltage terminals 802 and 804 are provided for coupling cable-termination circuit 800 to voltage supplies VCC and VEE, respectively. Typically, VCC is approximately +5 volts and VEE is approximately –5 volts.

PMOS transistors 811 and 813 of termination circuitry 810 operate analogously to switches 111 and 113 of FIGS. 1–4, and switches 111a,b and 113a,b of FIG. 5. PMOS transistors 811 and 813 are ON (i.e., conducting) when, for example, switches 111 and 113, respectively, are closed. Conversely, PMOS transistors 811 and 813 are OFF (i.e., non-conducting) when, for example, switches 111 and 113, respectively, are open. Control signal SW1EN, coupled to control terminal 105, drives the ON/OFF operation of PMOS transistor 811, while control signal SW2EN, coupled to control terminal 107, drives the ON/OFF operation of PMOS transistor 813.

Resistive elements 815, 817, and 819 of termination circuitry 810 are preferably thin film resistors and preferably laser trimmed to eliminate process variations and to cancel out the finite impedance of PMOS transistors 811 and 813.

One of the advantages of the present invention is the ability to maintain a selected termination configuration that uses PMOS transistors when power to the circuit is off (i.e., VCC and VEE are off), or when input voltages exceed a supply voltage. Input voltages can exceed a supply voltage when, for example, the cable-termination circuit is conformed to the V.28/RS-232 standard, which specifies voltage swings of +/–15 volts, easily exceeding input supply voltages of approximately +/–5 volts. A selected termination configuration is maintained by maintaining PMOS transistors 811 and 813 in an OFF state when, for example, termination circuitry 810 is configured as an open circuit or a differential load termination.

To maintain the OFF state of PMOS transistor 811, diodes 822 and 824 (preferably Schottky diodes) are coupled in parallel with PMOS transistor 811 as shown in FIG. 8. These diodes prevent the inherent well and substrate diodes of PMOS transistor 811 from forward biasing, and thus conducting, when the voltage at input terminal 101 or 103 exceeds a supply voltage, or when a voltage of sufficient magnitude is at input terminal 101 or 103 while power to cable-termination circuit 800 is off.

Similarly for PMOS transistor 813, diodes 826 and 828, which are preferably also Schottky diodes, prevent PMOS transistor 813 from incorrectly turning ON in the same manner.

To further maintain the OFF state of PMOS transistors 811 and 813, their gate voltages must be kept no more than one threshold voltage (i.e., typically approximately 0.7 volts) below their source or drain voltages. However, if the voltage at input terminal 101 or 103 exceeds a supply voltage, or a voltage of sufficient magnitude is at input terminal 101 or 103 while power to cable-termination circuit 800 is off, conduction may occur.

Level shift circuits 830 and 840, which are described in more detail below, are provided to ensure that the respective gate voltages of PMOS transistors 811 and 813 are no more than one threshold voltage below their respective source or drain voltage. Level shift circuit 830 pulls the gate voltage of PMOS transistor 811 via diode 831, 832, or 833 to whichever respective voltage is highest: the voltage at input terminal 101, the voltage at input terminal 103, or VCC. Diodes 831, 832, and 833 are each preferably Schottky diodes, which drop less than 0.7 volts when conducting. Similarly, level shift circuit 840 pulls the gate voltage of PMOS transistor 813 via diode 841 or 842 (also preferably Schottky diodes) to whichever respective voltage is highest: VCC or the voltage at node 843.

To reduce impedance variations in PMOS transistor 811 during conduction, which could adversely affect the differential impedance measured across input terminals 101 and 103, charge pump 850 ensures that PMOS transistor 811 stays in a low impedance state during conduction while a typical +/–7 volt common-mode voltage is at input terminals 101 and 103 by applying a negative potential of approximately –14 volts to the gate of PMOS transistor 811 to turn it ON. This allows cable-termination circuit 800 to advantageously operate over a wide common-mode range. PMOS transistor 813 does not require a charge pump because the common-mode voltage (measured at common terminal 109) is typically ground. Thus, PMOS transistor 813 can be turned ON by applying VEE to its gate. Charge pump 850, as explained in more detail below, is driven by control signal SW1EN and an oscillator input signal, which is preferably a square wave.

Other advantageous features of cable-termination circuit 800 preferably include clamp circuits 860 and 870, which are explained in more detail below and are provided to respectively prevent the gate-to-source voltage and the gate-to-drain voltage of PMOS transistor 811 from exceeding approximately +14 volts, which could damage the gate oxide of PMOS transistor 811. ESD (electrostatic discharge) protection cells 880a,b (which are known in the art) are preferably provided to respectively protect input terminals 101 and 103 from ESD strikes up to approximately 10 kilovolts. To prevent excessive power dissipation from destroying the chip, a standard thermal shutdown circuit (which is known in the art and not shown) is preferably provided to turn OFF PMOS transistors 811 and 813 when power dissipation exceeds a predetermined level.

Figure 9:
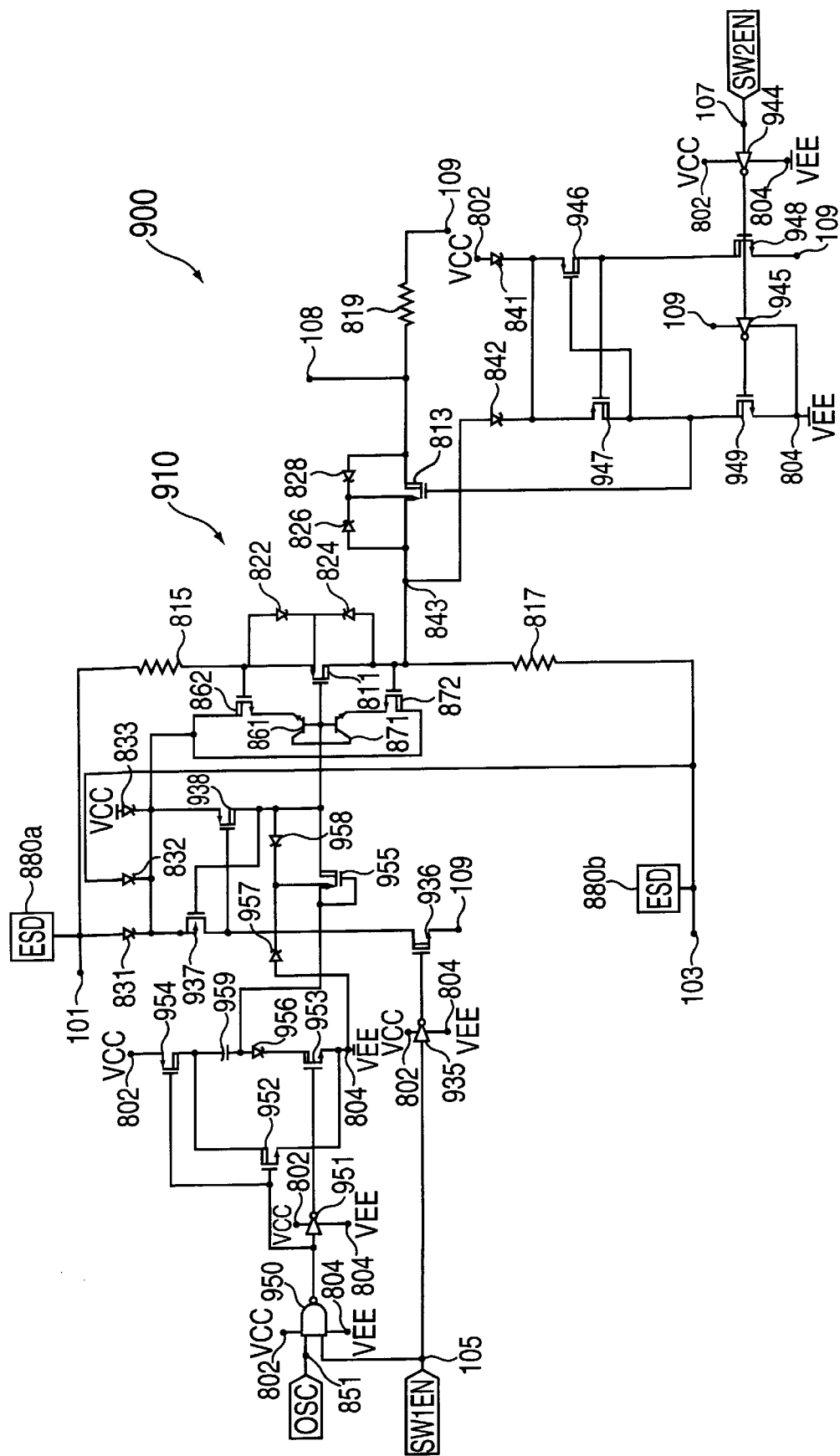
FIG. 9 is a schematic diagram of a preferred embodiment of circuitry for portions of the circuit of FIG. 8 according to the present invention.

FIG. 9 is a schematic diagram of an exemplary embodiment of termination circuitry in accordance with the present invention. Termination circuitry 910 includes preferred circuitry for level shift circuits 830 and 840, charge pump 850, and clamp circuits 860 and 870 of FIG. 8. Level shift circuit 830 preferably includes inverting driver 935, NMOS transistor 936, and PMOS transistors 937 and 938. Level shift circuit 840 preferably includes inverting drivers 944 and 945, PMOS transistors 946 and 947, and NMOS transistors 948 and 949. Charge pump 850 preferably includes NAND gate 950, inverting driver 951, NMOS transistors 952 and 953, PMOS transistors 954 and 955, diodes 956, 957, and 958 (which are preferably Schottky diodes), and capacitor 959. Clamp 860 preferably includes NPN bipolar transistor 861 and NMOS transistor 862, while clamp 870 similarly preferably includes NPN bipolar transistor 871 and NMOS transistor 872.

Preferably, cable-termination circuit 900 is integrated and fabricated on a single electronic chip, and packaged in a single electronic module, thus advantageously eliminating the need for bulky relays or connectors, or multiple custom cables or termination modules.

Termination circuitry 910 operates generally as follows: when oscillator signal OSC and signal SW1EN are high, PMOS transistor 954 and NMOS transistor 953 are turned ON, charging capacitor 959 to approximately 10 volts. When oscillator signal OSC goes low during the second portion of the cycle, NMOS transistor 952 turns ON pulling the top plate of capacitor 959 to VEE (approximately −5 volts) and forcing the bottom plate of capacitor 959 to approximately −15 volts. Diode 956 reverse biases to prevent the substrate diode of NMOS transistor 953 from discharging capacitor 959. PMOS transistor 955, which is configured as a diode, turns ON and pulls the gate of PMOS transistor 811 to approximately −14 volts, turning it ON. Diodes 957 and 958 prevent the N-well of PMOS transistor 955 from forward biasing to the substrate. At the start of the next oscillator cycle (i.e., when oscillator signal OSC again goes high) capacitor 959 again charges up, PMOS transistor 955 turns OFF, and charge is stored on the gate capacitance of PMOS transistor 811, keeping it ON.

When signal SW1EN goes low, NMOS transistor 936 turns ON pulling the gate of PMOS transistor 938 low. This turns PMOS transistor 938 ON and pulls the gate of PMOS transistor 811 high, turning it OFF along with PMOS transistor 937. The gate voltage of PMOS transistor 811 is then pulled via diode 831, 832, or 833 one Schottky diode drop lower than whichever respective voltage is higher: input terminal 101, input terminal 103, or VCC. This keeps PMOS transistor 811 OFF even though the voltage at input terminal 101 or 103 may be higher than VCC.

During conduction of PMOS transistor 811, when level shifting is not required, PMOS transistor 937 is ON and NMOS transistor 936 is OFF, pulling the gate of PMOS transistor 938 high, turning it OFF. Accordingly, no current flows from input supply voltage VCC, thus preventing the gate voltage of PMOS transistor 811 from shifting to the higher of the voltage at input terminal 101, the voltage at input terminal 103, or VCC, which would incorrectly cause PMOS transistor 811 to turn OFF.

Level shift circuit 840 operates similarly for PMOS transistor 813. When control signal SW2EN is low, NMOS transistor 948 is ON and NMOS transistor 949 is OFF, turning PMOS transistor 813 OFF. With NMOS transistor 948 ON, the gate of PMOS transistor 947 is pulled to ground, thus turning it ON. The gate of PMOS transistor 813 is now pulled via diode 841 or 842 to whichever respective voltage is higher: VCC or the voltage at node 843. Conversely, when control signal SW2EN is high, NMOS transistor 948 is OFF and NMOS transistor 949 is ON, pulling the gate of PMOS transistor 813 to VEE, thus turning it ON. PMOS transistor 946 is also turned ON by the conduction of NMOS transistor 949, which keeps PMOS transistor 947 OFF. The gate voltage of PMOS transistor 813 is thus prevented from shifting to the higher of VCC or the voltage at node 843, which would incorrectly cause PMOS transistor 813 to turn OFF.

If the voltage of PMOS transistor 811 exceeds the gate-to-source clamp voltage, which is the sum of the emitter base breakdown voltage (approximately 13 volts) of NPN bipolar transistor 861 and the gate-to-source voltage (approximately 1 volt) of NMOS transistor 862, clamp 860 turns ON, overpowering charge pump 850. Clamp 860 then maintains a constant voltage of approximately 13 volts across the gate-to-source of PMOS transistor 811 to prevent damage to PMOS transistor 811's gate oxide.

Similarly, clamp 870 turns ON, overpowering charge pump 850, when the gate-to-drain voltage of PMOS transistor 811 exceeds the gate-to-drain clamp voltage, which is the sum of the emitter base breakdown voltage (approximately 13 volts) of NPN bipolar transistor 871 and the gate-to-source voltage (approximately 1 volt) of NMOS transistor 872. Clamp 870 then maintains a constant voltage of approximately 13 volts across the gate-to-drain of PMOS transistor 811 to prevent damage to PMOS transistor 811's gate oxide.

Figure 10:
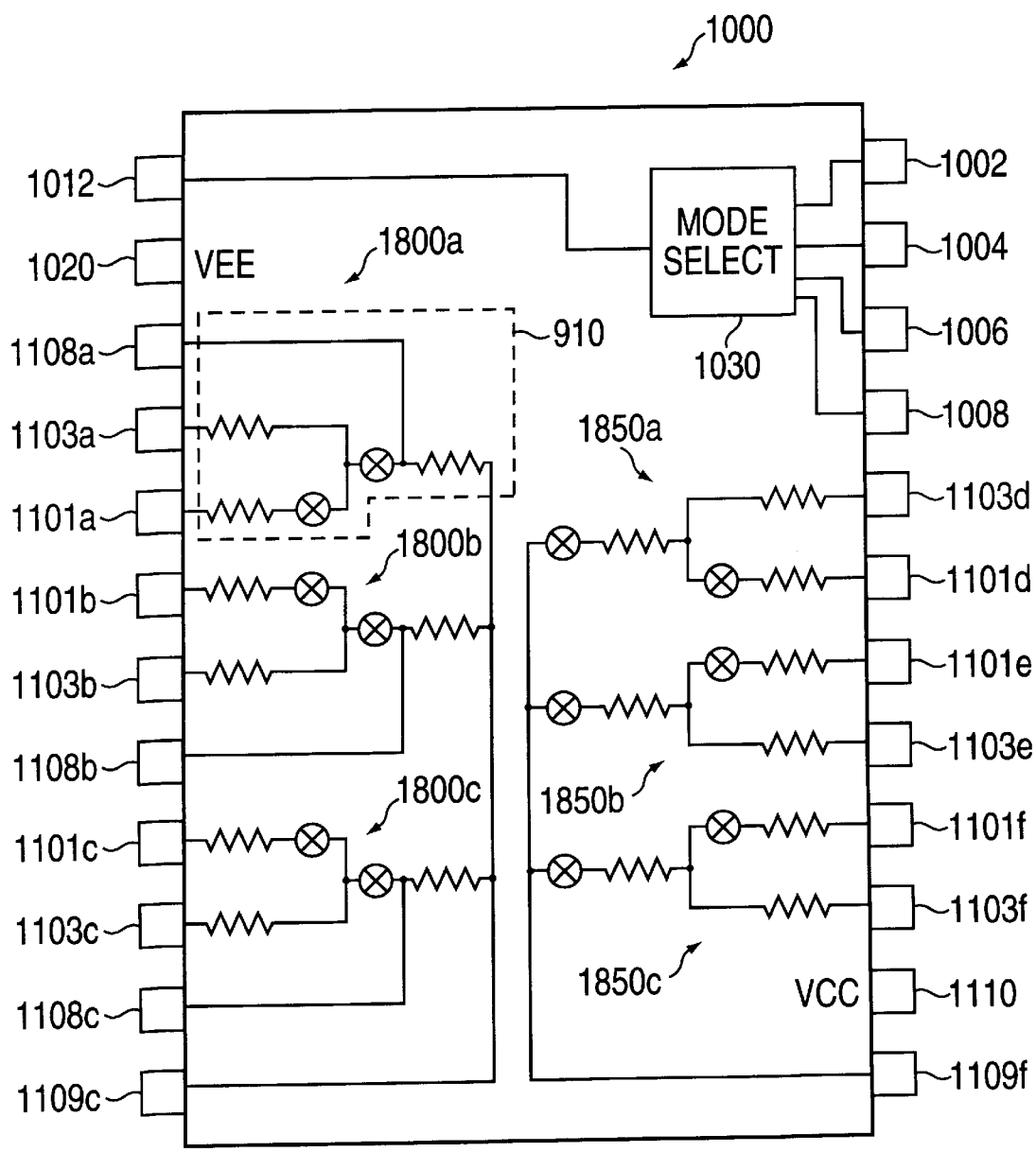
FIG. 10 is a simplified block diagram of an exemplary embodiment of a selectable cable terminator according to the present invention.

FIG. 10 is a simplified block diagram of an exemplary embodiment of a selectable cable terminator in accordance with the present invention. Selectable cable terminator 1000 includes a plurality of cable-termination circuits that are controllable to provide multiple cables with a plurality of selectable termination configurations for conforming to a plurality of electrical interface standards.

Selectable cable terminator 1000 includes cable-termination circuits 1800a,b,c having optional center tap output terminals 1108a,b,c, respectively, and cable-termination circuits 1850a,b,c. Preferably, cable-termination circuits 1800a,b,c, and 1850a,b,c are each configurable for conformance with the V.11/RS-422, V.35, V.10/RS-423, and V.28/RS-232 electrical interface standards. At least one cable-termination circuit preferably includes termination circuitry 910 of FIG. 9, shown representationally in FIG. 10 for cable-termination circuit 1800a.

Selectable cable terminator 1000 also includes first input terminals 1101a,b,c,d,e,f, second input terminals 1103a,b,c,d,e,f, and common output terminals 1109c,f, which are typically coupled to ground. Power terminals 1010 and 1020 are for providing supply voltages VCC and VEE to the cable-termination circuits and mode-select multiplexing circuitry 1030 (discussed below).

Selectable cable terminator 1000 further includes mode-select input terminals 1002, 1004, 1006, and 1008 for receiving mode-select signals. Mode-select signals indicate which cable-termination circuit is to be configured and which electrical interface standard the circuit is to be configured for. Multiplexing circuitry 1030 (known in the art) demultiplexes the mode-select signals and generates the control signals (e.g., SW1EN and SW2EN of FIGS. 8 and 9) for operating the first and second switches of the selected cable-termination circuit.

The following example illustrates a mapping of mode-select input signals received at terminals 1002, 1004, 1006, and 1008, respectively, to cable-termination circuits and termination configurations within those cable-termination circuits:

| mode-select signals | cable-termination circuit | termination configuration |
| --- | --- | --- |
| 0000 | all | open |
| 0001 | 1800a | V.11/RS-422 |
| 0010 | 1800a | V.35 |
| 0011 | 1800b | V.11/RS-422 |
| 0100 | 1800b | V.35 |
| 0101 | 1800c | V.11/RS-422 |
| 0110 | 1800c | V.35 |
| 0111 | 1850a | V.11/RS-422 |
| 1000 | 1850a | V.35 |
| 1001 | 1850b | V.11/RS-422 |
| 1010 | 1850b | V.35 |
| 1011 | 1850c | V.11/RS-422 |
| 1100 | 1850c | V.35 |
| 1101 | all | V.11/RS-422 |
| 1111 | all | V.35 |

Other mappings are possible, depending, for example, on the particular drivers and receivers being used and the interface standards being adhered to. Moreover, the number of mode-select input terminals provided by selectable cable terminator 1000 can be varied in accordance with this invention to accommodate other numbers of cable-termination circuits or multiplexing routines.

Optionally, terminal 1012 is provided to receive a control signal that permits cascading of multiple selectable cable terminators 1000. For example, inputs to terminal 1012 and multiplexing circuitry 1030 may operate as follows: when a signal received at terminal 1012 of a particular selectable cable terminator 1000 of a cascade of selectable cable terminators 1000 is low, mode-select signals received at input terminals 1002, 1004, 1006, and 1008 for that cable terminator 1000 are inhibited. Conversely, when the signal at terminal 1012 is high, mode-select signals received at input terminals 1002, 1004, 1006, and 1008 are enabled. Thus terminal 1012 permits mode-select signals to be directed to a particular cable terminator 1000 of a cascade of cable terminators 1000.

Note that the total number of terminals provided by selectable cable terminator 1000 can also be varied in accordance with this invention. For example, the common terminals of cable-termination circuits 1800$a,b,c$, and 1850$a,b,c$ can all be coupled to a single common output terminal rather than the two common output terminals 1109$c,f$. Furthermore, more or less center tap output terminals can be provided, as desired.

Selectable cable terminator 1000 preferably includes a thermal shutdown circuit (known in the art and not shown) that opens all switches when the chip temperature exceeds a predetermined level, such as, for example, 150° C.

Selectable cable terminator 1000 is preferably implemented in MOSFET technology, but, alternatively, may be implemented in bipolar transistor technology. Preferably, selectable cable terminator 1000 is integrated, fabricated on a single electronic chip, and packaged in a single electronic module. Alternatively, selectable cable terminator 1000 may be fabricated or packaged in discrete portions (e.g., multiple chips or modules) that share the same mode-select input signals.

Although the principles of the present invention have been illustrated with respect to the particular electrical interface standards described above, other embodiments in accordance with the present invention may include termination circuitry that can be configured for other interface standards in addition to, or instead of, the standards described above. Accordingly, the values of the three resistive elements can be selected to accommodate a range of impedance termination requirements.

Thus it is seen that a multi-protocol cable-termination circuit is presented that requires little space, can be selectably automatically configured to terminate a signal cable in conformance with one of a plurality of electrical interface standards, and maintains a selected configuration when input voltages exceed supply voltages or when power to the termination circuit is off. Persons skilled in the art will appreciate that the present invention can be practiced by other than the described embodiments, which are presented for purposes of illustration and not of limitation, and the present invention is limited only by the claims which follow.

What is claimed is:

1. A cable-termination circuit operable to terminate a signal cable in conformance with any one of a plurality of electrical interface standards, said circuit comprising:
   first and second input terminals;
   first and second control terminals;
   a common terminal; and
   termination circuitry coupled to said first and second input terminals, to said first and second control terminals, and to said common terminal, said termination circuitry comprising first and second switches, said first switch coupled between said first and second input terminals and said second switch coupled between said common terminal and a node between said first and second input terminals; wherein:
   said first and second switches are operable to configure said termination circuitry in conformance with any one of said plurality of electrical interface standards.

2. The circuit of claim 1 wherein said termination circuitry can be configured in conformance with a V.11/RS-422 standard.

3. The circuit of claim 1 wherein said termination circuitry can be configured in conformance with a V.10/RS-423 standard.

4. The circuit of claim 1 wherein said termination circuitry can be configured in conformance with a V.28/RS-232 standard.

5. The circuit of claim 1 wherein said termination circuitry can be configured in conformance with a V.35 standard.

6. The circuit of claim 5 wherein said termination circuitry can be configured in conformance with a V.11/RS-422 standard.

7. The circuit of claim 5 wherein said termination circuitry configured in conformance with a V.35 standard comprises T-network termination circuitry.

8. The circuit of claim 5 wherein said termination circuitry configured in conformance with a V.35 standard comprises delta network termination circuitry.

9. The circuit of claim 1 wherein termination circuitry comprises:
   said first switch is coupled to said first control terminal and said second switch is coupled to said second control terminal, and said termination circuitry further comprises:
   first and second resistive elements coupled in series with said first switch, the series combination of said first and second resistive elements and said first switch coupled between said first input terminal and said second input terminal; and
   a third resistive element coupled in series with said second switch, the series combination of said third resistive element and said second switch coupled to said common terminal and to a node between said first and second resistive elements.

10. The circuit of claim 9 further comprising a center tap output terminal coupled between said third resistive element and a node between said first and second resistive elements.

11. The circuit of claim 9 wherein an open said first switch remains open when power to said circuit is removed.

12. The circuit of claim 9 wherein an open said first switch remains open when an input terminal voltage exceeds a supply voltage.

13. The circuit of claim 9 further comprising a thermal sensor to sense power dissipation, said sensor causing said first and second switches to open if said power dissipation exceeds a predetermined level.

14. The circuit of claim 9 wherein said circuit is integrated and fabricated on a single electronic chip.

15. The circuit of claim 9 wherein said first and second switches comprise MOSFETs.

16. The circuit of claim 15 wherein said first switch comprises a PMOS transistor.

17. The circuit of claim 16 further comprising a charge pump coupled to said first control terminal and to said first switch for maintaining said first switch in a low impedance state when said first switch is ON.

18. The circuit of claim 16 wherein said second switch comprises a PMOS transistor.

19. The circuit of claim 18 further comprising a respective plurality of Schottky diodes coupled in parallel with said first switch and with said second switch to prevent the respective inherent well and substrate diodes of said first and second switches from conducting when said first and second switches are turned OFF.

20. The circuit of claim 18 further comprising a first level shift circuit coupled between said first control terminal and said first switch for maintaining said first switch's gate voltage at no more than approximately one threshold voltage below the voltage at either said first switch's drain or source, whichever is higher, when said first switch is OFF.

21. The circuit of claim 20 further comprising a second level shift circuit coupled between said second control terminal and said second switch for maintaining said second switch's gate voltage at no more than approximately one threshold voltage below the voltage at either said second switch's drain or source, whichever is higher, when said second switch is OFF.

22. A cable terminator operable to terminate multiple signal cables, each in conformance with any one of a Plurality of electrical interface standards, said cable terminator comprising:
    at least one input supply voltage terminal;
    a plurality of mode-select input terminals;
    mode-select circuitry coupled to said mode-select input terminals;
    at least one common output terminal; and
    a plurality of cable-termination circuits, each operable to terminate a signal cable in conformance with any one of said plurality of electrical interface standards, said plurality of cable-termination circuits coupled to said at least one input supply voltage terminal, at least one of said cable-termination circuits comprising:
        first and second input terminals;
        a common terminal coupled to said at least one common output terminal;
        first and second control terminals coupled to said mode-select circuitry; and
        termination circuitry coupled to said first and second input terminals, to said first and second control terminals, and to said common terminal, said termination circuitry comprising first and second switches, said first switch coupled between said first and second input terminals and said second switch coupled between said common terminal and a node between said first and second input terminals; wherein:
            said first and second switches are operable to configure said termination circuitry in conformance with any one of said plurality of electrical interface standards.

23. The cable terminator of claim 22 wherein at least one of said plurality of cable-termination circuits can be configured in conformance with a V.11/RS-422 standard.

24. The cable terminator of claim 22 wherein at least one of said plurality of cable-termination circuits can be configured in conformance with a V.10/RS-423 standard.

25. The cable terminator of claim 22 wherein at least one of said plurality of cable-termination circuits can be configured in conformance with a V.28/RS-232 standard.

26. The cable terminator of claim 22 wherein at least one of said plurality of cable-termination circuits can be configured in conformance with a V.35 standard.

27. The cable terminator of claim 26 wherein said at least one cable-termination circuit can be configured in conformance with a V.11/RS-422 standard.

28. The cable terminator of claim 22 wherein said at least one of said cable-termination circuits has a center tap output terminal coupled to said termination circuitry.

29. The cable terminator of claim 22 wherein said cable terminator is integrated and fabricated on a single electronic chip.

30. The cable terminator of claim 22 wherein said cable terminator is packaged in a single electronic module.

31. The cable terminator of claim 22 wherein said cable terminator comprises MOSFETs.

32. The cable terminator of claim 31 wherein said at least one of said cable-termination circuits further comprises a charge pump coupled to said termination circuitry.

33. A method of configuring a cable-termination circuit that terminates a signal cable in conformance with any one of a plurality of electrical interface standards, said cable-termination circuit comprising first and second switches operable to configure said cable-termination circuit in conformance with any one of said plurality of electrical interface standards, said method comprising:
    receiving a signal indicative of one of said plurality of electrical interface standards; and
    setting said first and second switches in response to said received signal to configure said cable-termination circuit in conformance with said one of said plurality of electrical interface standards.

34. The method of claim 33 wherein said setting comprises:
    generating a control signal for operating said first switch;
    generating a control signal for operating said second switch;
    operating said first switch in response to said generated first switch control signal; and
    operating said second switch in response to said generated second switch control signal.

35. The method of claim 33 wherein said received signal indicates a V.35 electrical interface standard, said setting comprising:
    generating a control signal to close said first switch;
    generating a control signal to close said second switch;
    closing said first switch in response to said generated first switch control signal; and
    closing said second switch in response to said generated second switch control signal.

36. The method of claim 33 wherein said received signal indicates a V.11/RS-422 electrical interface standard, said setting comprising:
    generating a control signal to close said first switch;
    generating a control signal to open said second switch;
    closing said first switch in response to said generated first switch control signal; and
    opening said second switch in response to said generated second switch control signal.

37. The method of claim 33 wherein said received signal indicates a V.28/RS-232 electrical interface standard, said setting comprising:
    generating a control signal to open said first switch;
    generating a control signal to open said second switch;
    opening said first switch in response to said generated first switch control signal; and
    opening said second switch in response to said generated second switch control signal.

38. The method of claim 33 wherein said received signal indicates a V.10/RS-423 electrical interface standard, said setting comprising:

generating a control signal to open said first switch;

generating a control signal to open said second switch;

opening said first switch in response to said generated first switch control signal; and opening said second switch in response to said generated second switch control signal.

39. The method of claim 33 wherein said cable-termination circuit further comprises first and second input terminals and at least one input supply voltage terminal, said method further comprising:

maintaining an open said first switch in an open state when the voltage at either said first or said second input terminal exceeds a supply voltage.

40. The method of claim 33 wherein said cable-termination circuit further comprises at least one input supply voltage terminal, said method further comprising:

maintaining an open said first switch in an open state when power to said cable-termination circuit is removed.

41. The method of claim 33 wherein said first switch comprises a PMOS transistor, said method further comprising:

limiting the gate voltage of said first switch to no more than approximately one threshold voltage below the voltage at either said first switch's drain or source, whichever is higher, when said first switch is OFF.

42. The method of claim 41 wherein said second switch comprises a PMOS transistor, said method further comprising:

limiting the gate voltage of said second switch to no more than approximately one threshold voltage below the voltage at either said second switch's drain or source, whichever is higher, when said second switch is OFF.

43. The method of claim 33 wherein said cable-termination circuit further comprises first and second input terminals and at least one input supply voltage terminal, and said first and second switches comprise PMOS transistors, said method further comprising:

preventing the respective inherent well and substrate diodes of said first and second switches from conducting when the voltage at either said first or said second input terminal exceeds a supply voltage.

44. The method of claim 33 wherein said first switch comprises a PMOS transistor, said method further comprising:

clamping the gate-to-drain and gate-to-source voltage of said first switch to a predetermined level to prevent damage to said first switch.

* * * * *

UNITED STATES PATENT AND TRADEMARK OFFICE
CERTIFICATE OF CORRECTION

PATENT NO : 6,018,549
DATED : January 25, 2000
INVENTION(S) : Reay et al.

It is certified that error appears in the above-identified patent and that said Letters Patent is hereby corrected as shown below:

Claim 9, column 12, line 28, delete "termination circuitry"; and
line 29, delete "comprises:".

Claim 22, column 13, line 22, "Plurality" should be --plurality--.

Signed and Sealed this

Sixth Day of March, 2001

Attest:

NICHOLAS P. GODICI

Attesting Officer

Acting Director of the United States Patent and Trademark Office